(12) United States Patent
Chang et al.

(10) Patent No.: US 12,480,551 B2
(45) Date of Patent: Nov. 25, 2025

(54) PAD LINER FOR BRAKE CALIPER, BRAKE CALIPER EQUIPPED WITH PAD LINER, AND METHOD FOR ASSEMBLING THE SAME

(71) Applicant: HYUNDAI MOBIS Co., Ltd., Seoul (KR)

(72) Inventors: Hong Seok Chang, Hanam-si (KR); Bo Ram Yoon, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 426 days.

(21) Appl. No.: 18/078,463

(22) Filed: Dec. 9, 2022

(65) Prior Publication Data
US 2023/0332656 A1   Oct. 19, 2023

(30) Foreign Application Priority Data
Apr. 19, 2022   (KR) .................. 10-2022-0048236

(51) Int. Cl.
*F16D 65/00*      (2006.01)
*F16D 65/097*     (2006.01)

(52) U.S. Cl.
CPC ..... *F16D 65/0977* (2013.01); *F16D 65/0068* (2013.01)

(58) Field of Classification Search
CPC .................... F16D 65/0977; F16D 65/0068

USPC ............................ D12/180; 188/73.36–73.38
See application file for complete search history.

(56) References Cited

U.S. PATENT DOCUMENTS 10,400,838 B2 * 9/2019 Reynolds ............ F16D 65/0977

FOREIGN PATENT DOCUMENTS

KR          10-1628600 B1    6/2016
KR     10-2019-0069884 A    6/2019

* cited by examiner

*Primary Examiner* — Christopher P Schwartz
(74) *Attorney, Agent, or Firm* — Morgan Lewis & Bockius LLP (57) ABSTRACT

The present disclosure relates to a pad liner for a brake caliper, a brake caliper equipped with the pad liner and a method for assembling the brake caliper, and a vehicle equipped with the brake caliper. The pad liner according to an embodiment of the present disclosure includes a body seated in a caliper body and formed in a shape of a flat plate, an upper elastic portion connected to an upper portion of the body, and a lower elastic portion connected to a lower portion of the body, the upper elastic portion applies an elastic force to an upper portion of the brake pad, and the lower elastic portion applies an elastic force to a lower portion of the brake pad. According to embodiments of the present disclosure, reliability of a return operation of the brake pad is ensured to reduce drag and braking noise.

18 Claims, 13 Drawing Sheets

FIG. 12

PAD LINER FOR BRAKE CALIPER, BRAKE CALIPER EQUIPPED WITH PAD LINER, AND METHOD FOR ASSEMBLING THE SAME

Pursuant to 35 U.S.C. § 119 (a), this application claims the benefit of Korean Patent Application No. 10-2022-0048236 filed on Apr. 19, 2022, which is hereby incorporated by reference as if fully set forth herein.

BACKGROUND

Field

The present embodiments relate to a pad liner for a brake caliper applicable to vehicles in all fields, and more particularly, to a pad liner that supports a foot portion of a brake pad.

Discussion of the Related Art

A brake caliper mounted on a vehicle is an apparatus for decelerating or stopping the traveling vehicle or maintaining the stopped state of the vehicle, and is an apparatus that obtains a braking force by strongly pressing a disk rotating together with a wheel of the vehicle with brake pads from both sides.

In the brake caliper, the two brake pads disposed on both sides of the brake disk are supported in a caliper body (housing) in a state of being able to move forward and backward. A pad support pin for guiding the forward and backward movement of the brake pad, and a spring member that elastically support an upper portion of each of two pad plates so as to prevent vibration of the pad plate and to enable smooth return operation may be installed in an upper portion of each of the two brake pads.

However, in such a brake caliper structure, an elastic force is intensively applied to the upper portion of the brake pad. Therefore, although the return operation is smooth by elasticity in the upper portion of the brake pad, the force may not be transmitted well to a lower portion of the brake pad and thus a brake pad surface may be returned in a state that is not parallel to a disk surface. When the return operation of the brake pad is incomplete because of such a problem, drag characteristics and braking noise are caused, which needs to be ameliorated.

A pad liner is a component mounted inside the brake caliper and supports the brake pads. Because the pad liner has a complicated structure, it is difficult to assemble the caliper body, the pad liner, and the brake pads. In particular, when the caliper body is of an integrated monoblock type, an assembly difficulty is high because the pad liner and the brake pads must be assembled inside the caliper body.

Background art for an embodiment disclosed herein is disclosed in each of Korean Patent Application Publication No. 10-2019-0069884 (published on Jun. 20, 2019, title of the invention: caliper apparatus) and Korean Patent No. 10-1628600 (published on Jun. 8, 2016, pad liner for reducing drag in brake caliper).

SUMMARY

Embodiments of the present disclosure are to provide a pad liner for a brake caliper capable of providing a uniform return force to a brake pad, a brake caliper equipped with the corresponding pad liner, and a method for assembling the same.

In addition, embodiments of the present disclosure are to provide a pad liner for a brake caliper that improves ease of assembly of the pad liner with respect to a monoblock caliper.

Further, embodiments of the present disclosure are to provide a pad liner for a brake caliper that reduces drag and noise during braking by securing a return force of a brake pad.

The technical problems to be solved by the present disclosure are not limited to the aforementioned problems, and any other technical problems not mentioned herein will be clearly understood from the following description by those skilled in the art to which the present disclosure pertains.

According to one of the embodiments of the present disclosure, a pad liner configured to be seated in a caliper body and supporting a brake pad includes a body including a flat plate, an upper elastic portion connected to an upper portion of the body, and a lower elastic portion connected to a lower portion of the body. The upper elastic portion is configured to apply an elastic force to an upper portion of the brake pad, and the lower elastic portion is configured to apply an elastic force to a lower portion of the brake pad.

Preferably, the upper elastic portion has a predetermined length, both distal ends of the upper elastic portion are bent at a predetermined angle in an inward direction of the body, and the upper elastic portion is configured to apply the elastic force to the brake pad in a laterally outward direction of the body.

Preferably, the upper elastic portion includes upper contact portions respectively bent in the inward direction of the body at both of the distal ends thereof, and an outer curved surface of the upper contact portion is configured to be in contact with the brake pad.

Preferably, the lower elastic portion has a predetermined length, has a predetermined angle with the body, and is configured to apply the elastic force to the brake pad in a laterally outward direction of the body.

Preferably, the pad liner further includes a lower end body fixing portion connected to the lower portion of the body and having a shape of a flat plate having a predetermined angle with the body, a cutout cut from a partial region of the lower end body fixing portion to a partial region of the body is defined, and the lower elastic portion is connected to the lower end body fixing portion and located in the cutout.

Preferably, the lower elastic portion includes at least two bent portions.

Preferably, the lower elastic portion includes a lower contact portion having a curved surface at an end thereof, and the curved surface of the lower contact portion is configured to be in contact with the brake pad.

Preferably, the body further includes a side surface body fixing portion in a shape of a flat plate vertically connected to an outer edge of a side surface of the body.

Preferably, a vertical distance between the upper contact portion and the side surface body fixing portion is greater than a thickness of the brake pad and smaller than a maximum movement distance of the brake pad, and a vertical distance between the lower contact portion and the side surface body fixing portion is greater than the thickness of the brake pad and smaller than the maximum movement distance of the brake pad.

Preferably, F the pad liner further includes a guide pin connecting portion connected to the body and having in a shape of surrounding a portion of an outer circumferential surface of a guide pin.

Preferably, the pad liner further includes a pad side surface support connected to a lower end of the body and configured to be in contact with a lower side surface of the brake pad so as to support the brake pad.

Preferably, the pad side surface support has a curvature, and an end of the pad side surface support is configured to be in contact with the lower side surface of the brake pad.

Preferably, the pad liner further includes an upper end body fixing portion in a shape of a flat plate connected to an edge of an upper end of the body, and the upper end body fixing portion is configured to be in contact with an inner surface of the caliper body to fix a position of the body.

Preferably, a movement distance of the upper contact portion of the upper elastic portion for movement or assembly of the brake pad is within a range of elastic deformation of the upper elastic portion, and a movement distance of the lower contact portion of the lower elastic portion for the movement or the assembly of the brake pad is within a range of elastic deformation of the lower elastic portion.

In a brake caliper equipped with the pad liner, a caliper body has a groove defined therein so as not to interfere with the lower elastic portion of the pad liner even when the lower elastic portion is elastically deformed.

In a brake caliper equipped with the pad liner, a friction pad of the brake pad does not interfere with the lower elastic portion of the pad liner even when the lower elastic portion is elastically deformed.

In a brake caliper equipped with the pad liner, a caliper body is of a monoblock type.

A method for assembling a brake caliper equipped with the pad liner includes pressing an upper contact portion of the upper elastic portion downward so as to be bent, inserting an upper end of the brake pad into a space between the upper contact portion and a side surface body fixing portion of the pad liner, and bringing a lower end of the brake pad into close contact with the side surface body fixing portion.

According to one of the embodiments of the present disclosure, reliability of a return operation of the brake pad is ensured, thereby reducing the drag and the braking noise.

In addition, the ease of assembly of the brake caliper may be increased. For example, in the case of the monoblock caliper body, because the brake pad may be inserted into the integrated caliper body, the assembly of the brake caliper is easy.

In addition, because the brake pad and the caliper body are easily detached from each other, maintenance such as repair of the brake caliper is easy.

The effects that may be obtained from the present disclosure are not limited to the effects mentioned above, and other effects not mentioned may be clearly understood by those with ordinary skill in the technical field to which the present disclosure belongs from the description below.

BRIEF DESCRIPTION OF THE DRAWINGS

(a) to (b) in FIG. 11 show a process of assembling a brake pad to a pad liner according to one of embodiments of the present disclosure.

DESCRIPTION OF SPECIFIC EMBODIMENTS

Advantages and features of the present disclosure, and a method for achieving the same, will become apparent with reference to the embodiments described below in detail in conjunction with the accompanying drawings. However, the present disclosure may not be limited to the embodiments disclosed below, but may be implemented in a variety of different forms. The present embodiments are provided only to ensure that the disclosure of the present disclosure is complete, and to completely inform those skilled in the art to which the present disclosure belongs, the scope of the present disclosure. The present disclosure is only defined by the scope of the claims.

The terminology used herein is for the purpose of describing the embodiments only and is not intended to limit the present disclosure. As used herein, the singular forms "a" and "an" are intended to include the plural forms as well, unless the context clearly indicates otherwise. As used herein, "comprises" and/or "comprising" do not exclude the presence or addition of one or more other components in addition to a stated component. Like reference numerals refer to like components throughout the specification, and "and/or" includes each of the mentioned components and every combination of one or more of the components. Although "first", "second", and the like are used to describe various components, it is apparent that such components are not limited by such terms. Such terms are only used to distinguish one component from another. Accordingly, it is apparent that the first component mentioned below may be the second component within the technical spirit of the present disclosure.

Unless otherwise defined, all terms including technical and scientific terms used herein have the same meaning as commonly understood by one of ordinary skill in the art to which the present disclosure belongs. In addition, terms defined in a commonly used dictionary are not to be interpreted ideally or excessively unless specifically defined explicitly.

Spatially relative terms "below", "beneath", "lower", "above", "upper", and the like may be used to easily describe a correlation between one component and other components as shown in the drawings. Spatially relative terms should be understood as terms including different directions of the components during use or operation in addition to directions shown in the drawings. For example, when a component shown in the drawings is flipped, a component described as being located "below" or "beneath"

another component may be placed "above" said another component. Accordingly, the exemplary term "below" may include both downward direction and upward direction. Components may also be oriented in other directions, and thus, spatially relative terms may be interpreted based on the orientation.

Figure 1:
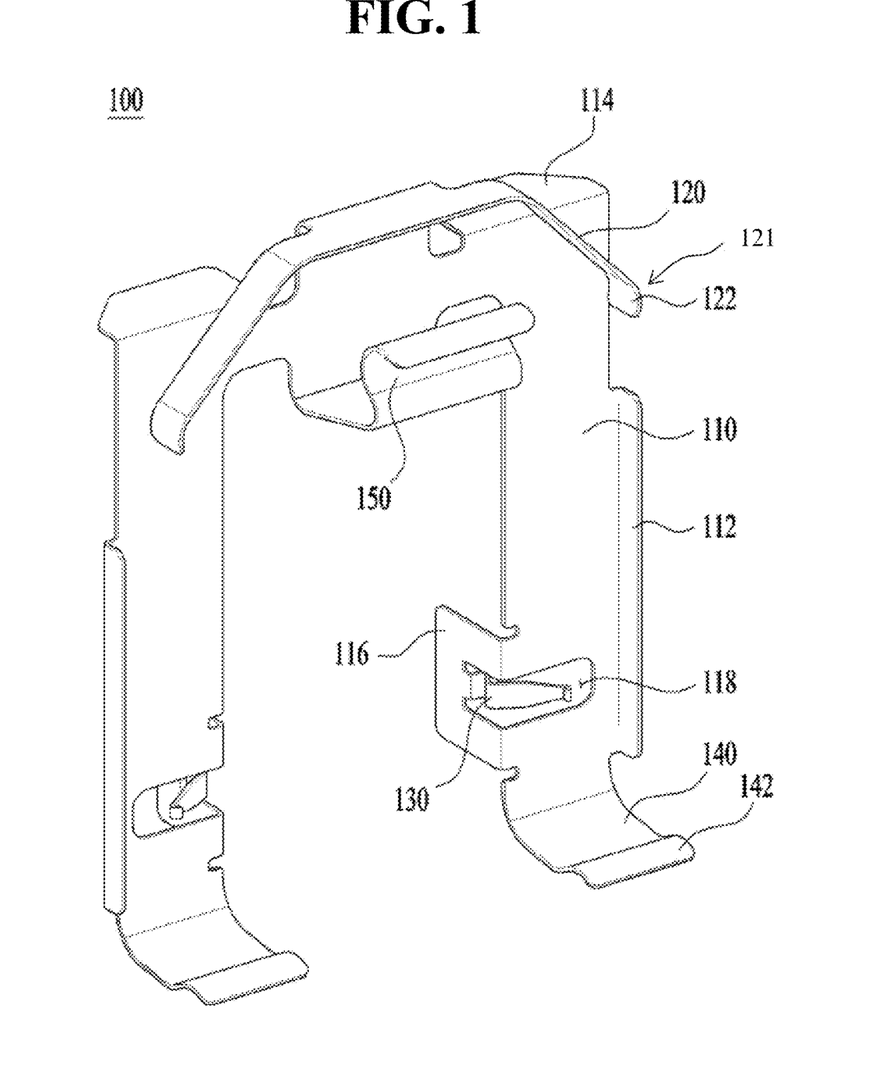
FIG. 1 is a 3D model perspective view of a pad liner for a brake caliper according to one of embodiments of the present disclosure.
Figure 2:
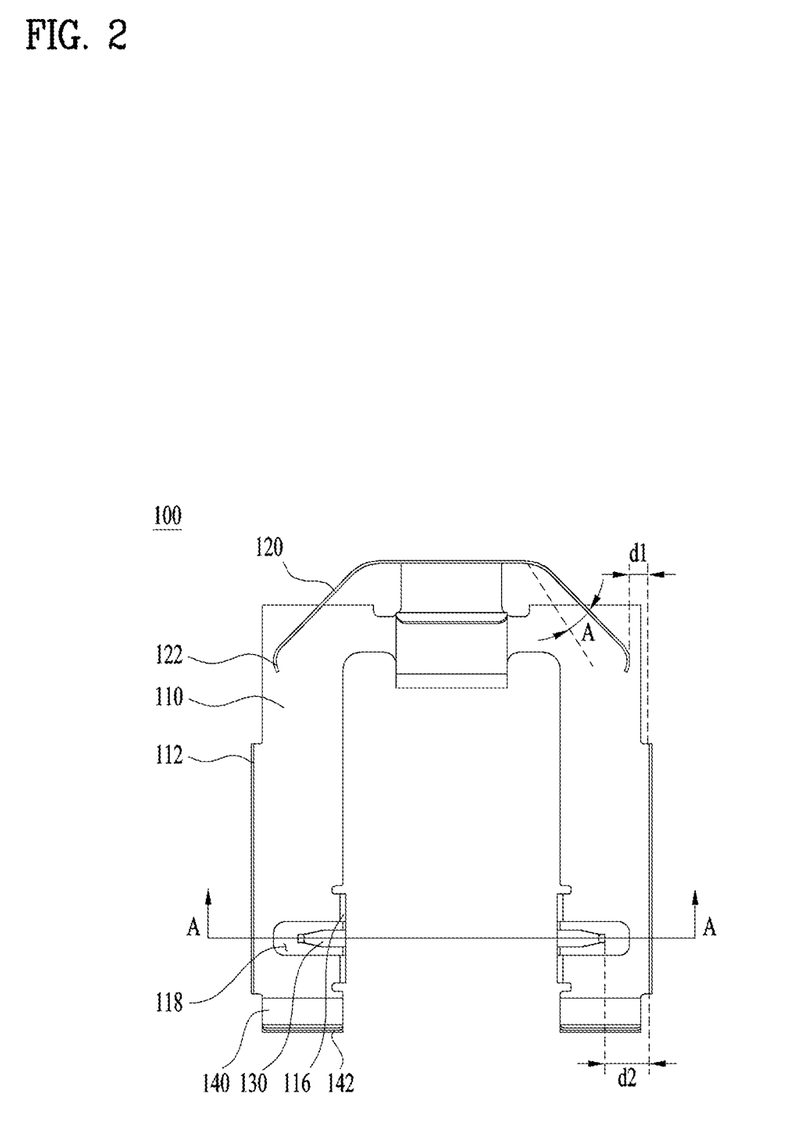
FIG. 2 shows a front surface of a 3D model of a pad liner according to one of embodiments of the present disclosure.
Figure 3:
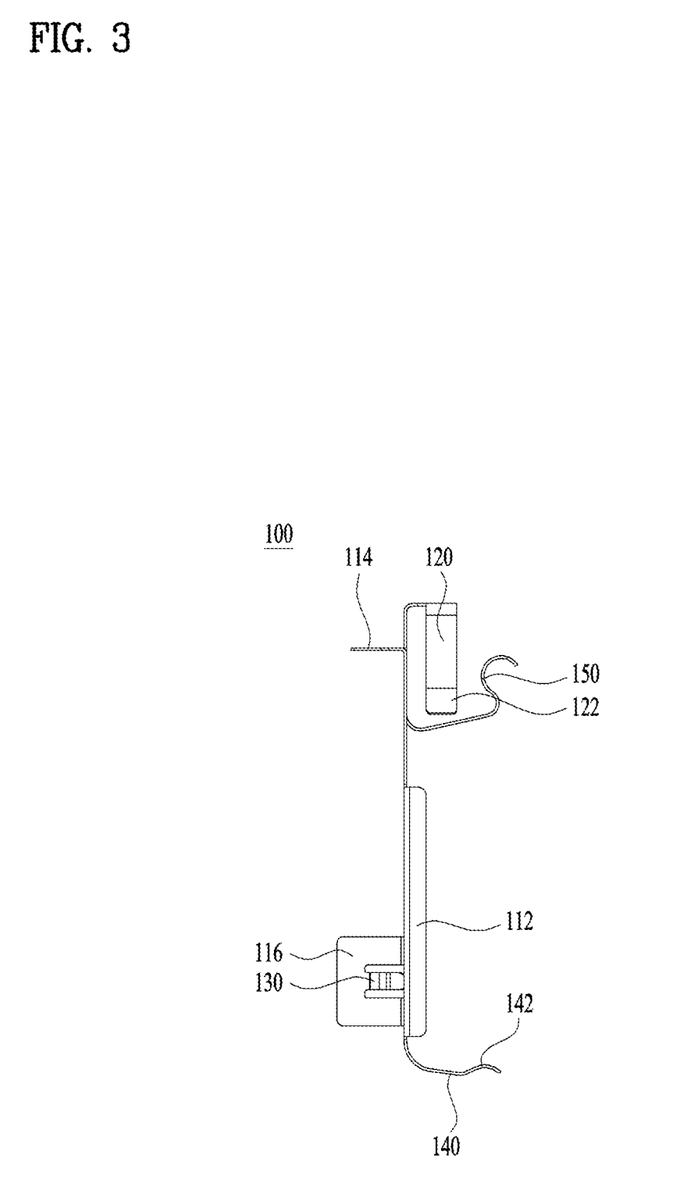
FIG. 3 shows a side surface of a 3D model of a pad liner according to one of embodiments of the present disclosure.
Figure 4:
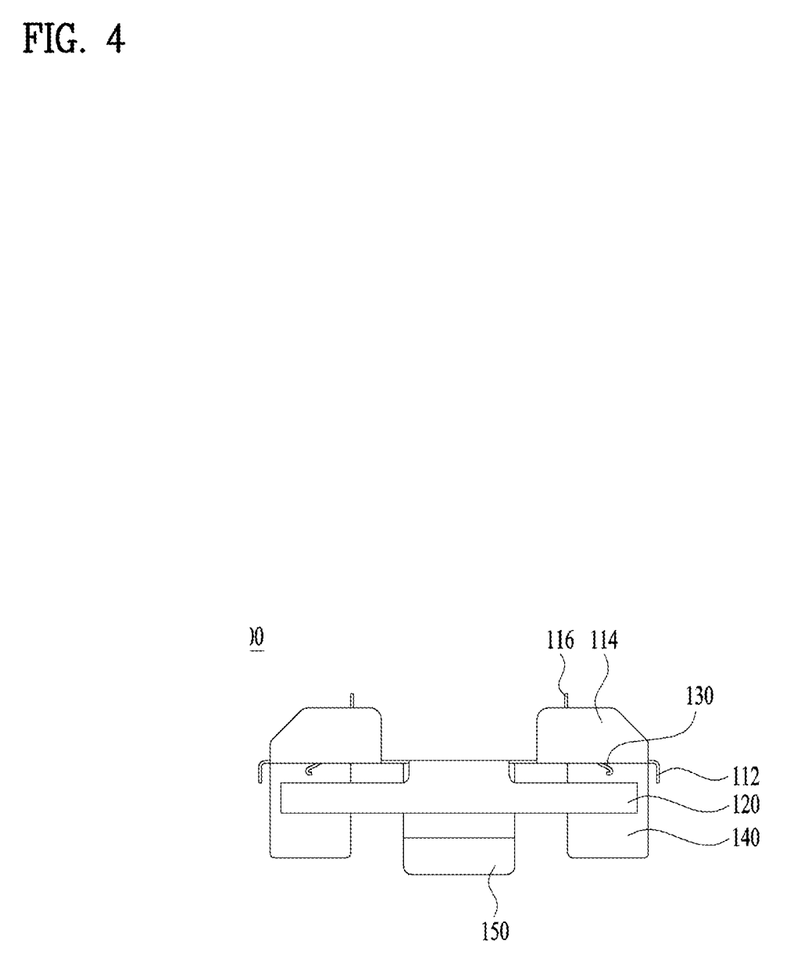
FIG. 4 shows a top surface of a 3D model of a pad liner according to one of embodiments of the present disclosure.
Figure 5:
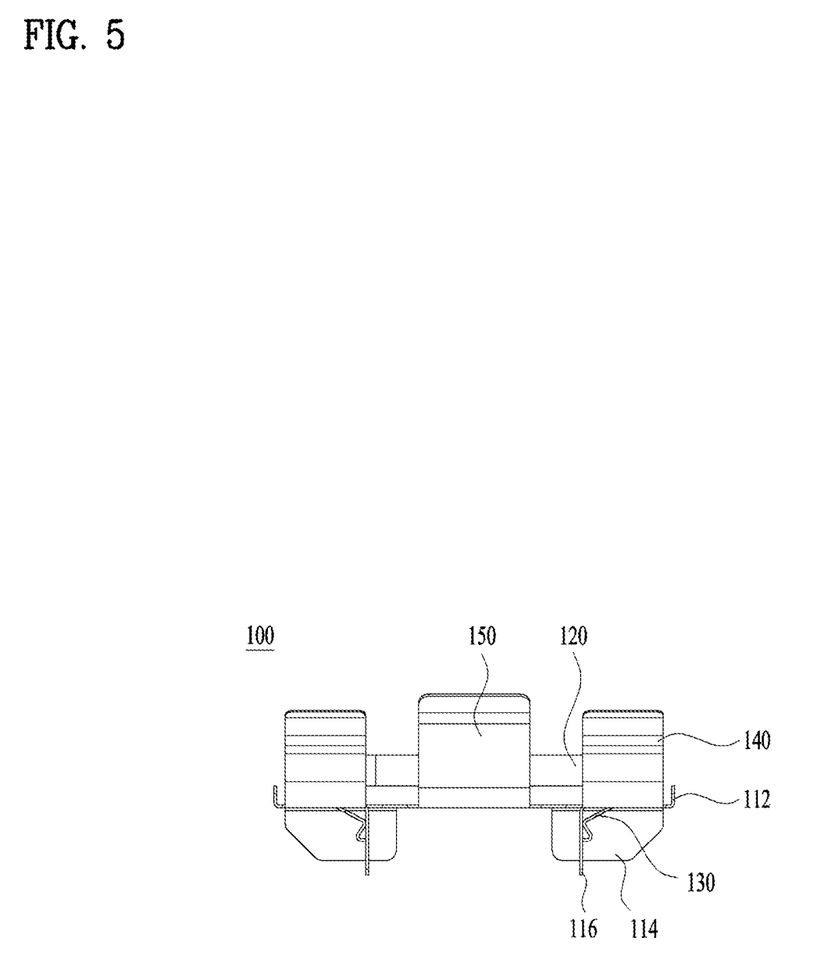
FIG. 5 shows a bottom surface of a 3D model of a pad liner according to one of embodiments of the present disclosure.

FIG. 1 is a 3D model perspective view of a pad liner for a brake caliper (hereinafter, referred to as a "pad liner") 100 according to one of embodiments of the present disclosure. FIG. 2 shows a front surface of a 3D model of the pad liner 100. FIG. 3 shows a side surface of the 3D model of the pad liner 100. FIG. 4 shows a top surface of the 3D model of the pad liner 100. FIG. 5 shows a bottom surface of the 3D model of the pad liner 100.

In describing the pad liner, forward, rearward, leftward, rightward, upward, and downward directions will be described with reference to FIG. 1. The forward direction is a direction in which a viewable surface of the pad liner 100 shown in FIG. 1 is directed, and the leftward direction indicates a direction of a left surface of the pad liner 100 shown in FIG. 1. The upward direction indicates a direction of the top surface of the pad liner 100 shown in FIG. 1.

Referring to FIGS. 1 to 5, the pad liner 100 includes a body 110 formed of a flat plate, an upper elastic portion 120, and a lower elastic portion 130. In addition, the pad liner 100 may include an upper end body fixing portion 114, a side surface body fixing portion 112, and a lower end body fixing portion 116. In addition, the pad liner 100 may include a pad side surface support 140 and a guide pin connecting portion 150.

The body 110 according to an embodiment is formed of the flat plate, and the flat plate may have a '⊏' shape. As shown in FIG. 1, the body 110 may have a shape in which the '⊏' is erected vertically. The body 110 may be made of a metal material and may have an appropriate thickness so as to have an elastic force against bending or the like.

The upper elastic portion 120 is a component that is connected to an upper portion of the body 110 and applies an elastic force to an upper portion of a brake pad 300. The upper elastic portion 120 may be a bar member having a predetermined length, and both ends of the bar in a horizontal state may be bent by a predetermined angle so as to be in parallel with the flat plate of the body 110 in an inward direction of the body 110 (in the downward direction in FIG. 1). Accordingly, the upper elastic portion 120 is the bar member in which both of the distal ends 121 are bent, and both of the distal ends 121 of the horizontal bar are able to be changed in angles as the brake pad 300 moves forward and backward, but provide a return force to the brake pad 300 by a restoring force. That is, the upper elastic portion 120 may apply the elastic force to the brake pad 300 in a laterally outward direction of the body 110. The brake pad 300 is located at a side edge of the body 110, and moves inwardly of the body 110 when a wheel is braked. Because the upper elastic portion 120 is bent by the movement of the brake pad 300, the elastic force may be applied to the brake pad 300 accordingly.

Each of the distal ends 121 of the upper elastic portion 120 includes an upper contact portion 122 that is bent in the inward direction of the body 110 (in the downward direction in FIG. 1) And includes a curved surface. The upper contact portion 122 is a portion in contact with the brake pad 300. Because an outer surface of the upper contact portion 122 is a convex curved surface, when the upper contact portion 122 is in contact with the brake pad 300, friction may be reduced.

When the pad liner 100 is seated inside a caliper body 200, an entirety or a portion of the upper elastic portion 120 may be exposed via an upper opening of the caliper body 200 (see FIGS. 7 to 10). Therefore, a structure that is convenient for a person to bend or curve the upper elastic portion 120 when assembling the brake pad 300 inside the caliper body 200 may be achieved. An imaginary plane including a trajectory of an elastic movement of the upper contact portion 122 of the upper elastic portion 120 may be parallel to a plane of the body 110.

The lower elastic portion 130 is a component that is connected to a lower portion of the body 110, and applies the elastic force to a lower portion of the brake pad 300. The lower elastic portion 130 may have a predetermined length and may be connected to the body 110 at a predetermined angle. The lower elastic portion 130 may apply the elastic force to the brake pad 300 in the laterally outward direction of the body 110.

In more detail, as shown in the drawings, the body 110 may further include the lower end body fixing portion 116 at the lower portion thereof. The lower end body fixing portion 116 may be a flat plate vertically connected to a lower inner edge of the body 110 in the shape of the vertical "⊓". The lower end body fixing portion 116 is directed in the rearward direction of the pad liner 100 and is in contact with an inner surface of the caliper body 200 so as to fix a position of the pad liner 100.

The lower elastic portion 130 may be a component that is connected to the lower end body fixing portion 116. A cutout 118 may be defined by cutting a partial region of the lower end body fixing portion 116 and a partial region of the body 110, and the lower elastic portion 130 connected to the lower end body fixing portion 116 may be located inside the cutout 118. When manufacturing the pad liner 100, the above-described structure may be formed by bending, cutting, or incising one flat plate. In order to manufacture the pad liner 100 with one plane, the plane is cut to be shaped, then a corresponding portion of the plane is incised to form the lower elastic portion 130, then the lower end body fixing portion 116 is vertically bent, and then the lower elastic portion 130 is bent, so that the pad liner 100 may be manufactured as shown in the drawing.

Figure 6:
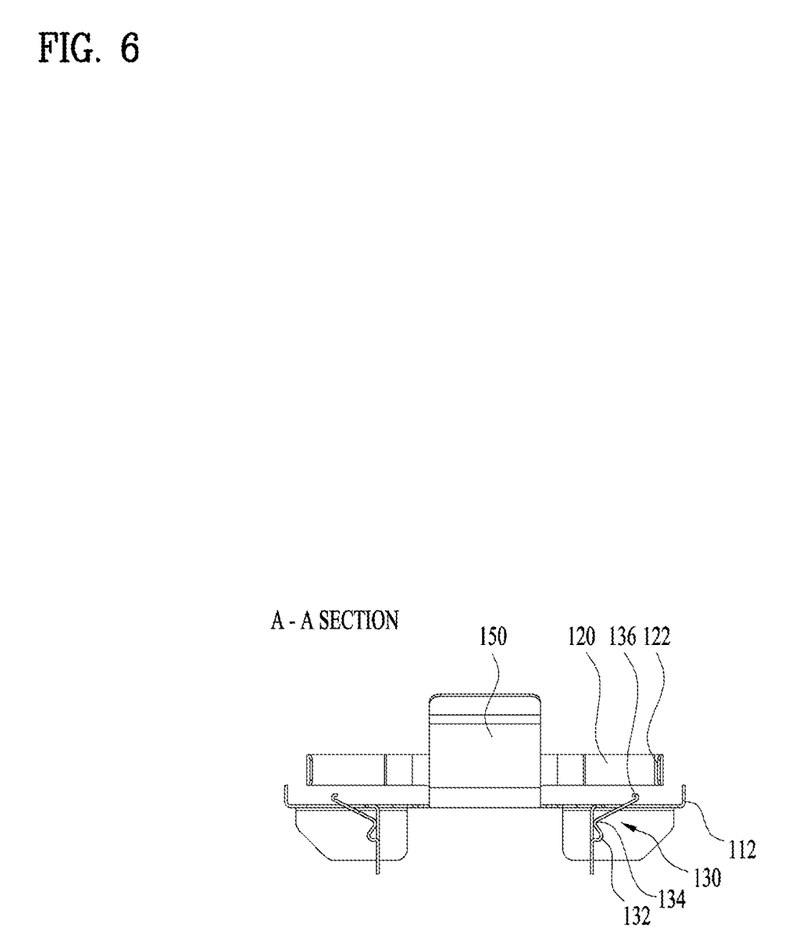
FIG. 6 shows a cross-section of a pad liner taken along a line A-A according to one of embodiments of the present disclosure.

Referring to FIG. 6, a cross-section taken along a line A-A in FIG. 2 is shown. FIG. 6 shows the bent shape of the lower elastic portion 130. The lower elastic portion 130 may form a predetermined angle with the flat plate of the body 110 by having at least two bent portions 132 and 134. The lower elastic portion 130 is a bar member having a predetermined length. One end of the lower elastic portion 130 may be connected to the lower end body fixing portion 116 and the other end thereof may be directed in the laterally outward direction of the body 110, and the lower elastic portion 130 may include the at least two bent portions (a first bent portion 132 and a second bent portion 134). In addition, the lower elastic portion 130 may form the predetermined angle with the flat plate of the body 110, and the angle formed with the body 110 may be changed as the brake pad 300 moves forward and backward. Therefore, because of such deformation, the lower elastic portion 130 may apply the return force to the brake pad 300 by the elastic force.

An end of the lower elastic portion 130 may include a lower contact portion 136 having a curved surface. The curved surface of the lower contact portion 136 may come into contact with the brake pad 300 to reduce friction at the contact portion.

An imaginary plane including a trajectory of an elastic movement of the lower contact portion 136 of the lower elastic portion 130 may be parallel to a plane of the body 110. When the pad liner 100 is assembled inside the caliper body 200, the lower elastic portion 130 is located inside the caliper body 200, so that it is difficult for a person to directly deform the lower elastic portion 130 (see FIGS. 7 to 10). However, an inclination of the lower elastic portion 130 is formed to protrude in the forward direction of the pad liner 100 from an inner portion to an outer portion of the body 110, so that, by an operation of simply pushing the brake pad 300 outwardly of the pad liner 100, the brake pad 300 may push the lower elastic portion 130 and be seated on the pad liner 100 (see FIGS. 11 to 12).

The side surface body fixing portion 112 is a component formed of a flat plate vertically connected to an outer edge of the side surface of the body 110. The side surface body fixing portion 112 protrudes in the forward direction of the pad liner 100, and a length, a width, and the like of the side surface body fixing portion 112 may be appropriately selected by those skilled in the art. The side surface body fixing portion 112 may fix the position of the pad liner 100 by being in contact with the inner surface of the caliper body 200. In addition, the side surface body fixing portion 112 may support the brake pad 300.

A vertical distance d1 (FIG. 2) between the upper contact portion 122 and the side surface body fixing portion 112 is greater than a thickness of the brake pad 300, but smaller than a maximum movement distance of the brake pad 300. In addition, a vertical distance d2 (FIG. 2) between the lower contact portion 136 and the side surface body fixing portion 112 is greater than the thickness of the brake pad 300, but is smaller than the maximum movement distance of the brake pad 300. That is, factors such as a bent angle or a length of the upper elastic portion 120 or the lower elastic portion 130 may be appropriately selected by those skilled in the art based on the above-mentioned criteria. Based on the above-mentioned criteria, the pad liner 100 may apply the appropriate elastic force to the brake pad 300. The thickness of the brake pad 300 may indicate a thickness of a pad plate 310 (FIG. 10B). In addition, the upper elastic portion 120 and the lower elastic portion 130 may be made of a material having appropriate properties (a modulus of elasticity or the like) such that plastic deformation does not occur as the brake pad 300 moves, and the lengths or the angles thereof may be changed.

The guide pin connecting portion 150 is a component that is connected to the body 110 and has a shape of surrounding a portion of an outer circumferential surface of a guide pin (not shown).

Figure 7:
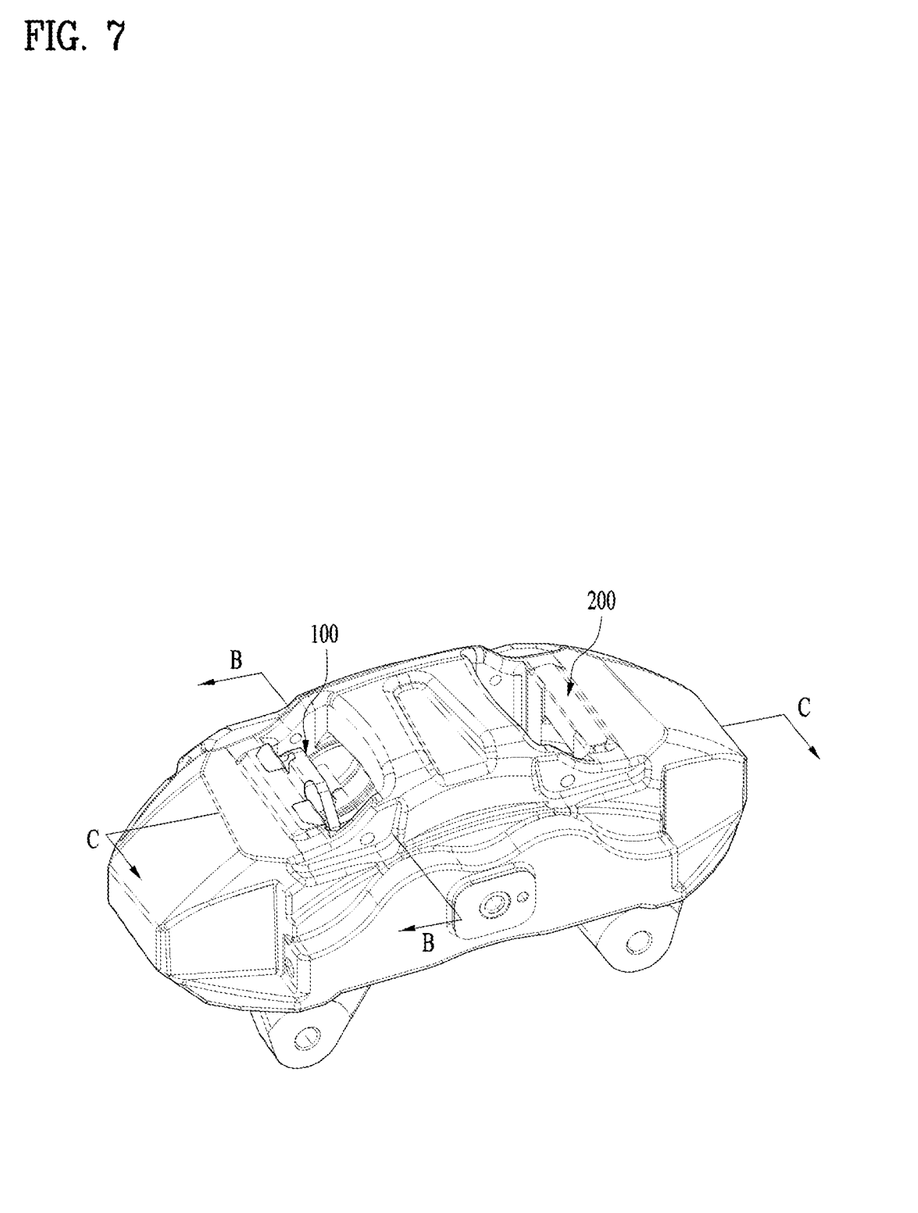
FIG. 7 shows a brake caliper in which a pad liner is mounted, according to one of embodiments of the present disclosure.
Figure 8:
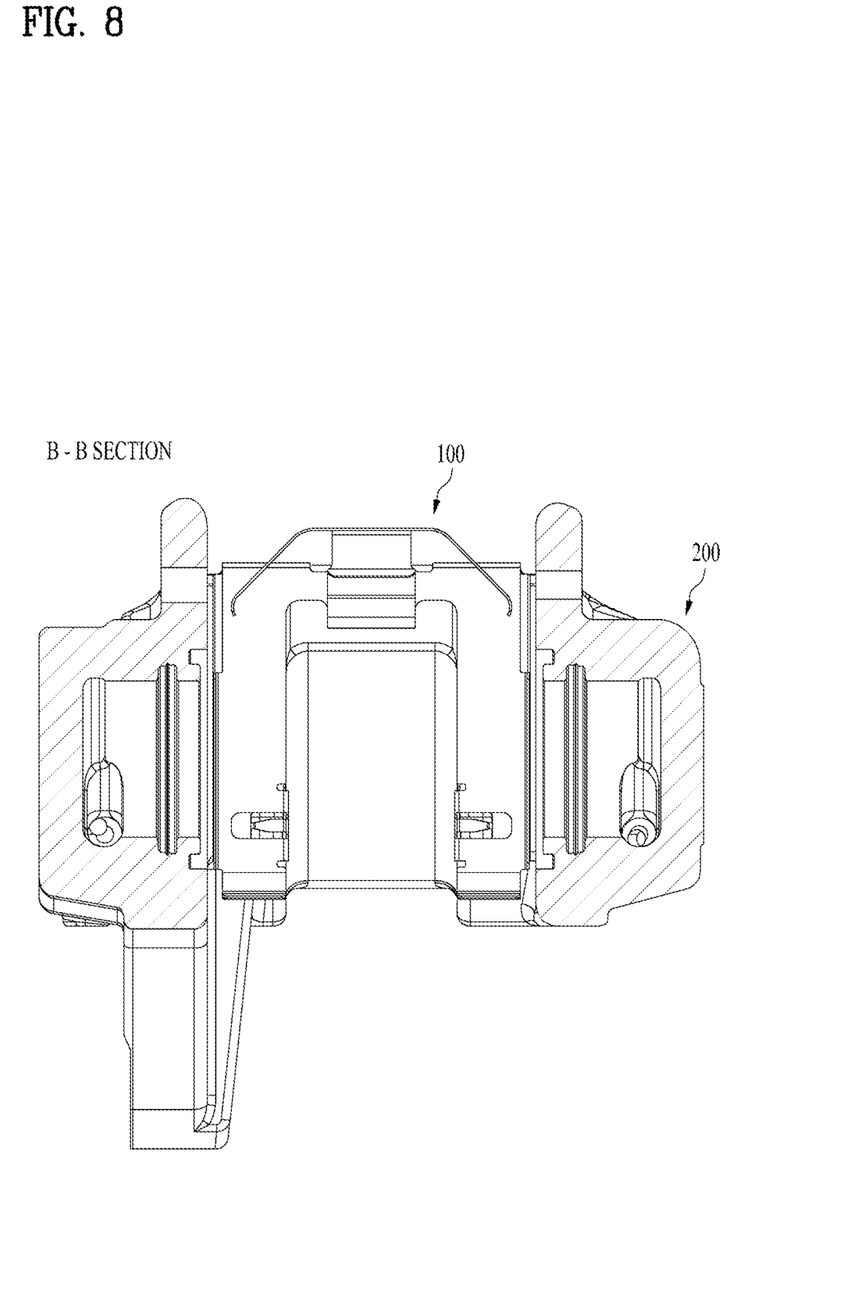
FIG. 8 shows a cross-section taken along a line B-B in FIG. 7.
Figure 9:
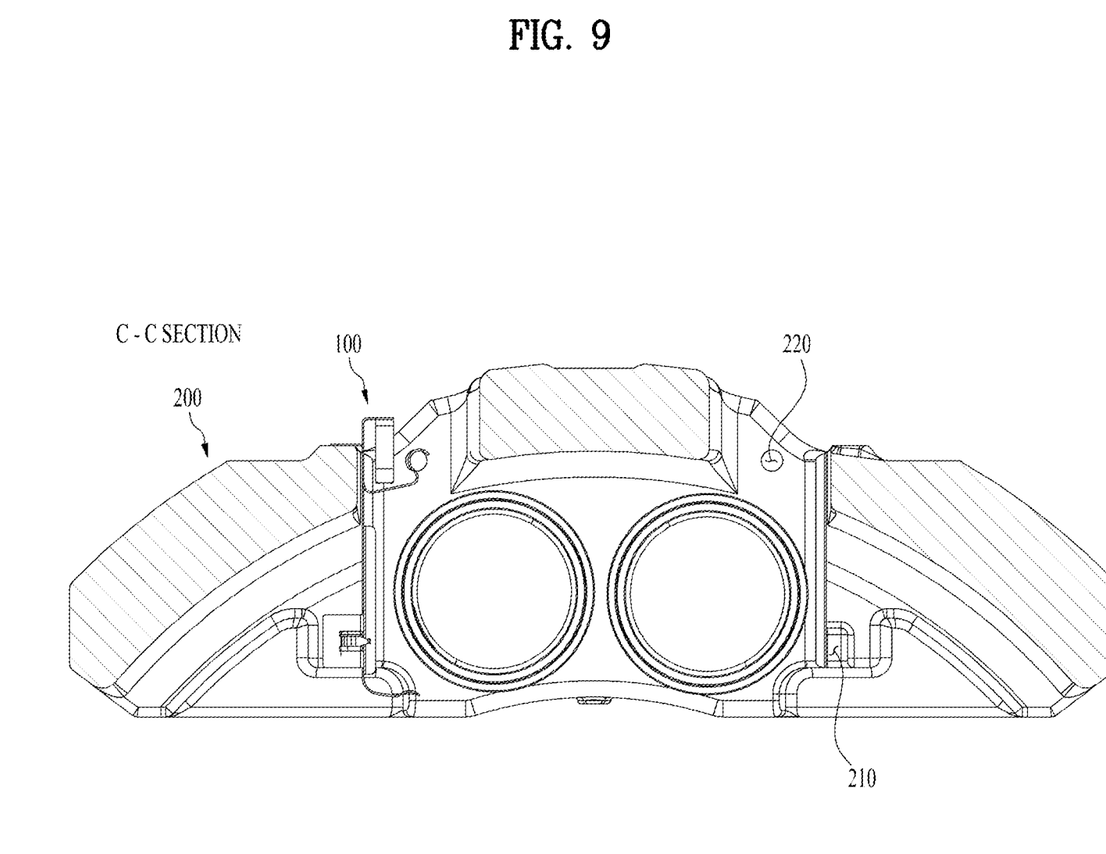
FIG. 9 shows a cross-section taken along a line C-C in FIG. 7.

FIG. 7 shows a brake caliper in which the pad liner 100 is mounted, FIG. 8 shows a cross-section taken along a line B-B in FIG. 7, and FIG. 9 shows a cross-section taken along a line C-C in FIG. 7.

Referring to FIGS. 7 to 9, a state in which the pad liner 100 is disposed inside the caliper body 200 is illustrated. FIGS. 7 to 9 do not show the guide pin, but a guide pin hole 220 defined in the caliper body 200 is shown in FIG. 9. The guide pin (not shown) may pass through the guide pin hole 220 and may be disposed in a direction crossing an inner space of the caliper body 200.

The guide pin connecting portion 150 is formed in the shape surrounding the outer circumferential surface of the guide pin (not shown), so that the pad liner 100 may be more stably disposed inside the caliper body 200.

The pad side surface support 140 may be connected to a lower end of the body 110 and may support the brake pad 300 by being in contact with a lower side surface of the brake pad 300. The pad side surface support 140 is vertically connected to an edge of a lower end of the body 110 and protrudes in the forward direction of the pad liner 100. The protruding pad side surface support 140 may have a curvature such that an outer surface thereof is convex, and an end of the pad side surface support 140 may include a pad side surface contact portion 142 formed to be flat so as to easily support the brake pad 300. The pad side surface contact portion 142 may be in surface contact with the lower side surface of the brake pad 300 to reduce friction.

Figure 10A:
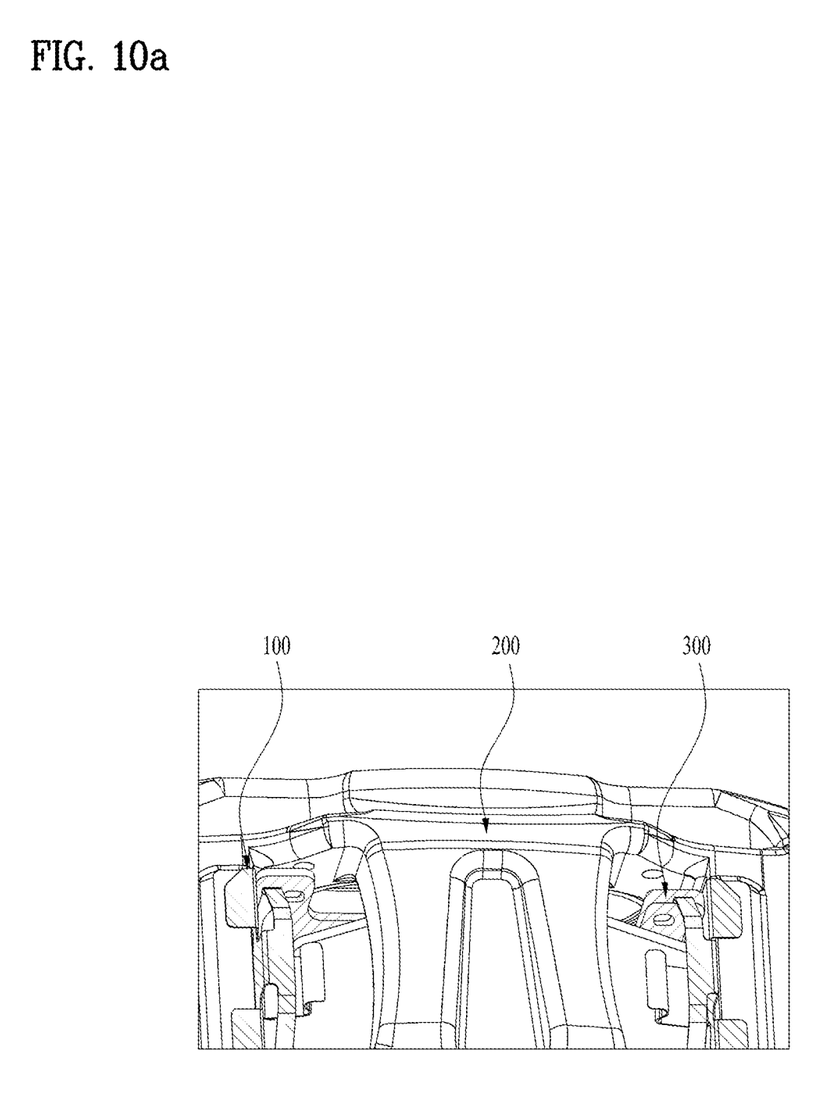
FIGS. 10A to 10B show top and bottom views of a brake pad mounted inside a brake caliper.
Figure 10B:
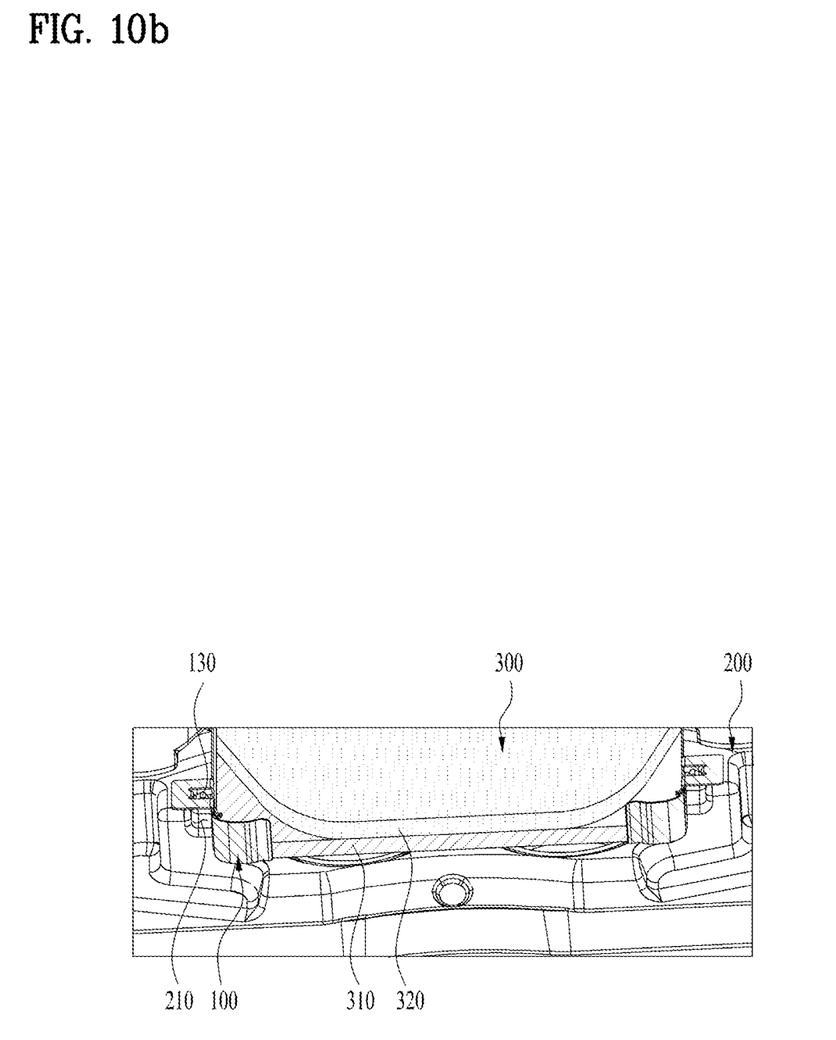

FIGS. 10A to 10B show top and bottom views of the brake pad 300 mounted inside a brake caliper.

Referring to FIG. 10B, a state in which the pad side surface contact portion 142 is in contact with the lower side surface of the brake pad 300 so as to support the brake pad 300. In FIG. 10B, it may be understood that the pad side surface contact portion 142 invades a region of the pad plate 310, but the pad side surface contact portion 142 is in contact with and supports the lower side surface of the brake pad 300.

In one example, the body 110 may further include the upper end body fixing portion 114 having a flat plate shape connected to an edge of an upper end thereof. The upper end body fixing portion 114 is vertically connected to the edge of the upper end of the body 110 and protrudes in the rearward direction. The upper end body fixing portion 114 may be in contact with the inner surface of the caliper body 200 to fix the position of the body 110.

The caliper body 200 shown in FIGS. 7 to 10 may include a groove 210 so as not to interfere with the lower elastic portion 130 of the pad liner 100. Because the angle of the lower elastic portion 130 varies based on the (forward or backward) movement of the brake pad 300, the groove 210 is defined such that a shape of the caliper body 200 does not interfere with the range of variability thereof. Similarly, a region occupied by a friction pad 320 in the brake pad 300 may be designed to be an appropriate region on the pad plate 310 so as not to interfere with the range of variability of the lower elastic portion 130.

Figure 11:
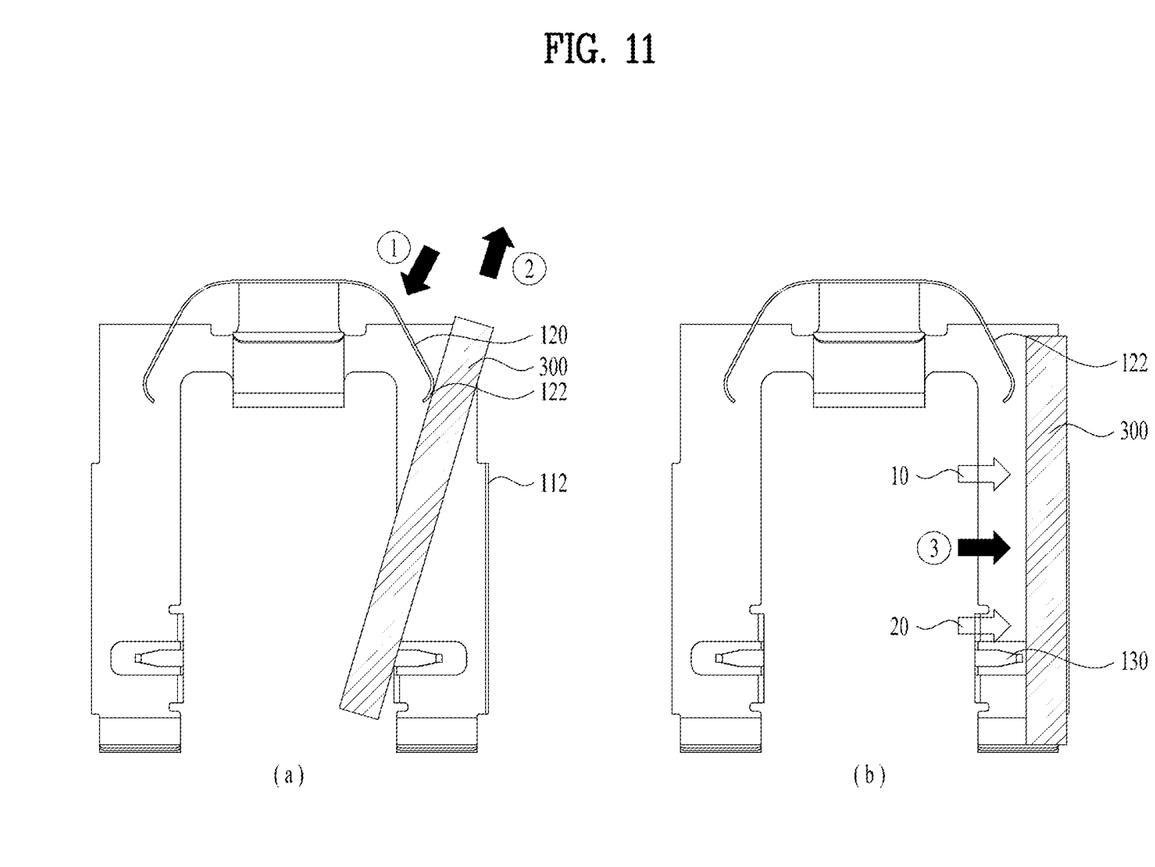
Figure 12:
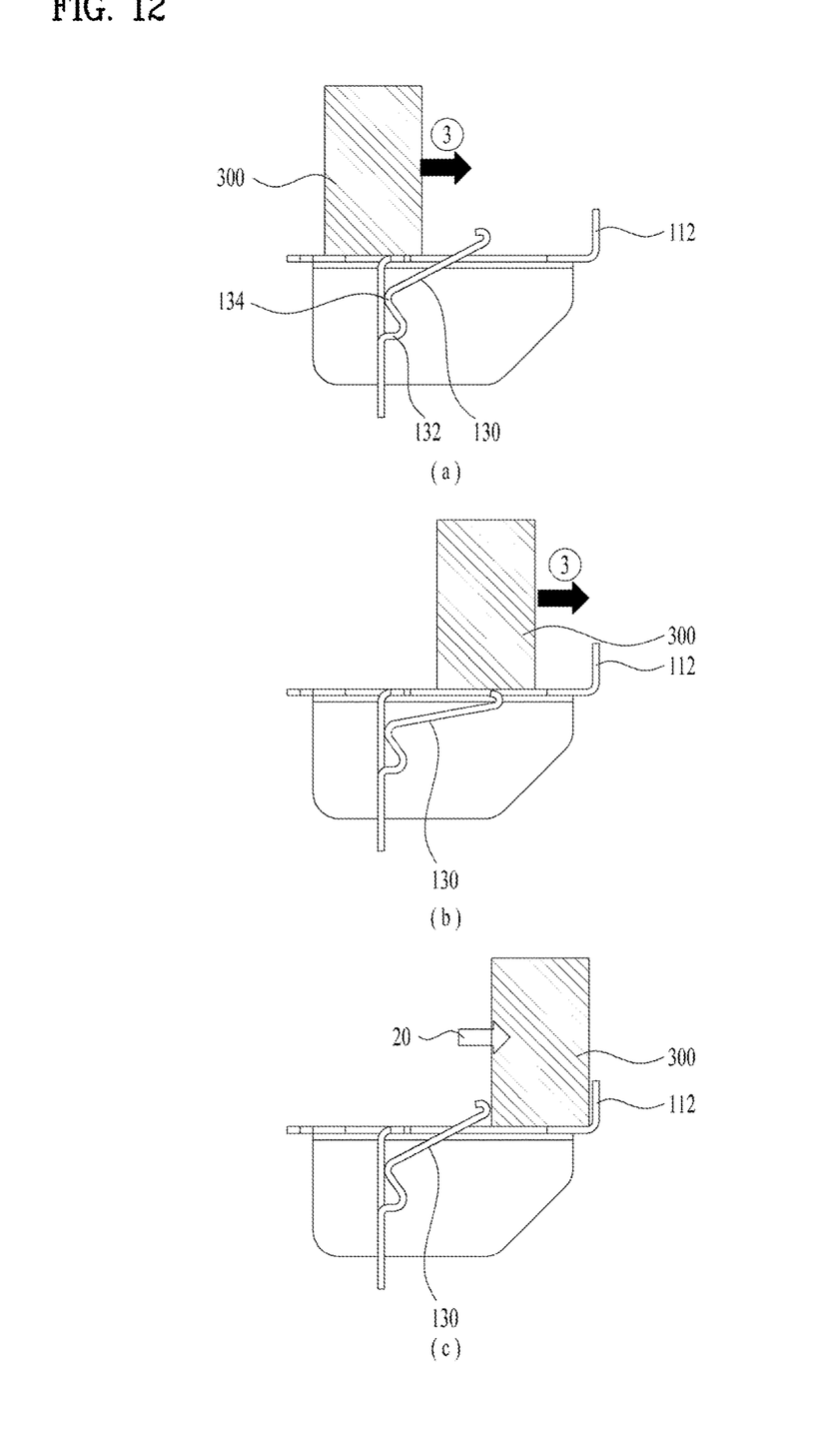
FIG. 12 shows a process of assembling a brake pad to a pad liner according to one of embodiments of the present disclosure.

(a) to (b) in FIG. 11 show a process of assembling the brake pad 300 to the pad liner 100. In addition, FIG. 12 shows a process of assembling the brake pad 300 to the pad liner 100.

Hereinafter, a method for assembling the brake pad 300 to the brake caliper in which the pad liner 100 is mounted according to an embodiment will be described.

Referring to FIG. 11, (a) is a view showing that an upper end of the brake pad 300 is inserted into a space between the upper contact portion 122 and the side surface body fixing portion 112 of the pad liner 100 in a state in which the upper elastic portion 120 or the upper contact portion 122 of the pad liner 100 is pressed and moved in the downward direction of the pad liner 100. Then, by allowing a lower end of the brake pad 300 to be in contact with the side surface body fixing portion 112, the brake pad 300 may be assembled to the brake caliper.

When the brake pad 300 is assembled, the upper elastic portion 120 may apply the return force to the upper portion of the brake pad 300 in a direction of an arrow 10, and the lower elastic portion 130 may apply the return force to the lower portion of the brake pad 300 in a direction of an arrow 20, so that the brake pad 300 may receive the return force uniformly at the upper and lower portions thereof.

FIG. 12 is a detailed view of a process in which the lower portion of the brake pad 300 is assembled. When the lower end of the brake pad 300 is brought into close contact with the side surface body fixing portion 112, the angle of the lower elastic portion 130 varies. The brake pad 300 may be assembled when being simply pushed.

In one example, the range of variability A (see FIG. 2) of the upper elastic portion 120 and the range of variability B (see FIG. 12) of the lower elastic portion 130 may be appropriately designed such that the assembly of the brake pad 300 and the forward and backward movement of the brake pad 300 are possible within ranges without the plastic deformation of the upper elastic portion 120 and the lower elastic portion 130. That is, a distance (the range of variability) at which the upper contact portion 122 of the upper elastic portion 120 moves for the movement or the assembly of the brake pad 300 must be within an elastic deformation range of the upper elastic portion 120, and a distance (the range of variability) at which the lower contact portion 136 of the lower elastic portion 130 moves for the movement or the assembly of the brake pad 300 must be within an elastic deformation range of the lower elastic portion 130.

In one example, the caliper body 200 according to an embodiment may be of a monoblock type. The monoblock type refers to a body in which an entirety of the caliper body 200 is integrated. In a case of the monoblock-type caliper body 200, there is a problem in that it is difficult to assemble a part (e.g., the brake pad) inside the caliper body 200. However, when utilizing the pad liner 100 according to the embodiments, the brake pad 300 may be easily assembled by being inserted into the caliper body 200 via the opening of the caliper body 200. After the pad liner 100 is inserted into the caliper body 200 via the opening of the caliper body 200 and seated therein, the brake pad 300 may be inserted into the caliper body 200 and pushed from the inner portion to the outer portion of the pad liner 100 so as to be assembled inside the caliper body 200. The monoblock type is not only beautiful in appearance, but also allows the brake pad 300 to have a wider area. In addition, the monoblock-type caliper body 200 may be of an opposing type such that the brake pads 300 may press a brake disk (not shown) in both directions, so that a braking response thereof may be excellent. Therefore, by utilizing the pad liner 100 according to the embodiment, the advantage of the monoblock type-brake caliper may be further increased.

The bent portion according to the embodiments disclosed herein may be formed in a method of bending one member or in a method of connecting a plurality of members to each other by welding or the like.

In the pad liner, the brake caliper equipped with the pad liner, a vehicle equipped with the brake caliper, and the brake caliper assembly method according to the various embodiments of the present disclosure, a drag phenomenon and a braking noise during a braking operation of the vehicle may be effectively reduced. By applying the return force symmetrically to both of the side surfaces of the brake pad, the entire brake pad may move uniformly.

In addition, the brake pad may be easily assembled into the brake caliper by the structure of the pad liner. In addition, as the pad liner efficiently transfers the return force to the brake pad, a braking performance may be improved. In addition, when the caliper body is of the monoblock type, the brake pad may be easily assembled after the pad liner is seated inside the caliper body.

The description of each of the various embodiments of the present disclosure is not limited only for the corresponding embodiment, and it is understood that the technical idea for each embodiment applied in the various embodiments may be applied to the other embodiments as well.

The detailed descriptions of the preferred embodiments of the present disclosure disclosed as described above have been provided to enable those skilled in the art to implement and practice the present disclosure. Although described above with reference to the preferred embodiments of the present disclosure, those skilled in the art will be able to understand that the present disclosure may be variously modified and changed without departing from the scope of the present disclosure. For example, those skilled in the art may use the components described in the above-described embodiments in a manner of combining the components with each other.

Accordingly, the present disclosure is not intended to be limited to the embodiments described herein, but is to be accorded the widest scope consistent with the principles and novel features disclosed herein.

What is claimed is:

1. A pad liner configured to be seated in a caliper body and supporting a brake pad, wherein the pad liner comprises:
a body including a flat plate;
an upper elastic portion connected to an upper portion of the body; and
a lower elastic portion connected to a lower portion of the body,
wherein the upper elastic portion is configured to apply an elastic force to an upper portion of the brake pad,
wherein the lower elastic portion is configured to apply an elastic force to a lower portion of the brake pad,
wherein the upper elastic portion is configured to apply the elastic force to the brake pad in a laterally outward direction of the body, and
wherein the lower elastic portion is configured to apply the elastic force to the brake pad in the laterally outward direction of the body.

2. The pad liner of claim 1, wherein the upper elastic portion has a predetermined length, wherein both distal ends of the upper elastic portion are bent at a predetermined angle in an inward direction of the body.

3. The pad liner of claim 2, wherein the lower elastic portion includes a lower contact portion having a curved surface at an end thereof,
wherein the curved surface of the lower contact portion is configured to be in contact with the brake pad.

4. The pad liner of claim 3, wherein the body further includes a side surface body fixing portion in a shape of a flat plate vertically connected to an outer edge of a side surface of the body.

5. The pad liner of claim 4, wherein a vertical distance between the upper contact portion and the side surface body fixing portion is greater than a thickness of the brake pad and smaller than a maximum movement distance of the brake pad,
wherein a vertical distance between the lower contact portion and the side surface body fixing portion is greater than the thickness of the brake pad and smaller than the maximum movement distance of the brake pad.

6. The pad liner of claim 3, wherein a movement distance of the upper contact portion of the upper elastic portion for movement or assembly of the brake pad is no more than elastic deformation of the upper elastic portion,
wherein a movement distance of the lower contact portion of the lower elastic portion for the movement or the assembly of the brake pad is no more than elastic deformation of the lower elastic portion.

7. The pad liner of claim 2, wherein the upper elastic portion includes upper contact portions respectively bent in the inward direction of the body at both of the distal ends thereof, wherein an outer curved surface of the upper contact portion is configured to be in contact with the brake pad.

8. The pad liner of claim 1, further comprising a pad side surface support connected to a lower end of the body and configured to be in contact with a lower side surface of the brake pad so as to support the brake pad.

9. The pad liner of claim 8, wherein the pad side surface support has a curvature, wherein an end of the pad side surface support is configured to be in contact with the lower side surface of the brake pad.

10. The pad liner of claim 1, wherein the lower elastic portion has a predetermined length, has a predetermined angle with the body.

11. The pad liner of claim 1, further comprising a lower end body fixing portion connected to the lower portion of the body and having a shape of a flat plate having a predetermined angle with the body,
wherein a cutout cut from a partial region of the lower end body fixing portion to a partial region of the body is defined,
wherein the lower elastic portion is connected to the lower end body fixing portion and located in the cutout.

12. The pad liner of claim 1, wherein the lower elastic portion includes at least two bent portions.

13. The pad liner of claim 1, further comprising a guide pin connecting portion connected to the body and having in a shape of surrounding a portion of an outer circumferential surface of a guide pin.

14. The pad liner of claim 1, further comprising an upper end body fixing portion in a shape of a flat plate connected to an edge of an upper end of the body,
wherein the upper end body fixing portion is configured to be in contact with an inner surface of the caliper body to fix a position of the body.

15. A brake caliper equipped with the pad liner of claim 1, wherein a caliper body has a groove defined therein so as not to interfere with the lower elastic portion of the pad liner even when the lower elastic portion is elastically deformed.

16. A method for assembling a brake caliper equipped with a pad liner, wherein the pad liner comprises a body including a flat plate, an upper elastic portion connected to an upper portion of the body, and a lower elastic portion connected to a lower portion of the body, and wherein the method comprises:

moving an upper contact portion of the upper elastic portion downward;
inserting an upper end of the brake pad into a space between the upper contact portion and a side surface body fixing portion of the pad liner such that the upper elastic portion is configured to apply an elastic force to the brake pad in a laterally outward direction of the body towards the side surface body fixing portion; and
bringing a lower end of the brake pad into close contact with the side surface body fixing portion such that the lower elastic portion is configured to apply an elastic force to the brake pad in the laterally outward direction of the body towards the side surface body fixing portion.

17. A pad liner configured to be seated in a caliper body and supporting a brake pad, wherein the pad liner comprises:
a body including a flat plate;
an upper elastic portion connected to an upper portion of the body; and
a lower elastic portion connected to a lower portion of the body,
wherein the upper elastic portion is configured to apply an elastic force to an upper portion of the brake pad,
wherein the lower elastic portion is configured to apply an elastic force to a lower portion of the brake pad, and
wherein the body further includes a side surface body fixing portion in a shape of a flat plate vertically connected to an outer edge of a side surface of the body.

18. The pad liner of claim 17, wherein a vertical distance between the upper contact portion and the side surface body fixing portion is greater than a thickness of the brake pad and smaller than a maximum movement distance of the brake pad,
wherein a vertical distance between the lower contact portion and the side surface body fixing portion is greater than the thickness of the brake pad and smaller than the maximum movement distance of the brake pad.

* * * * *